3,663,575
PROCESS FOR THE PRODUCTION OF AROMATIC LACTONES

Ernst Roos, Cologne-Flittard, and Klaus Wagner, Cologne-Buchheim, Germany, assignors to Farbenfabriken Bayer Aktiengesellschaft, Leverkusen, Germany
No Drawing. Filed July 2, 1968, Ser. No. 741,851
Claims priority, application Germany, Aug. 23, 1967,
F 53,311
Int. Cl. C07d 5/34
U.S. Cl. 260—343.3     4 Claims

ABSTRACT OF THE DISCLOSURE

Production of aromatic lactones by hydrolyzing an aromatic compound, e.g. benzene, naphthalene and diphenyldichloro-methane compounds, containing at least two orthdichloromethyl groups, with the remainder of the nuclear positions thereof having all of the corresponding hydrogen atoms thereat substituted by chloro and/or dichloromethyl substituents, with a hydrolyzing agent, e.g. at least about 75% sulfuric acid or oleum at about 80–200° C., such aromatic lactones being usable as intermediates for reaction with primary and secondary amines, i.e. to exchange one or more chloro substituents therewith, to form fluorescent dyes or optical brighteners, those aromatic lactones in which at least one substituent is other than chloro being new.

---

It is already known that benzal chloride(s) can be reacted with concentrated sulphuric acid at elevated temperature to give benzaldehyde(s). This process may be similarly applied to aromatic compounds containing the group —CHCl$_2$ either twice or several times in the molecule, in which case the corresponding dialdehydes or polyaldehydes are obtained. When reacted with concentrated sulphuric acid, ortho-bis-(dichloromethyl)-benzene also gives the ortho-phthalaldehyde by a similar mechanism (see E. Hjelt, Berichte der Deutschen Chemischen Gesellschaft, 18 (1885) 2881). In the hitherto known reactions, partial substitution of nuclear hydrogen atoms by chlorine atoms in the aromatic ortho-bis-(dichloromethyl)-compounds did not have any effect on the course of the reaction. Thus, trichloro-o-bis-(dichloromethyl)-benzene is hydrolysed with concentrated sulphuric acid to give trichloro-o-phthalaldehyde (see German Patent No. 360,414, Frdl. 14, 378).

Surprisingly, a process for the production of aromatic lactones has now been found in which aromatic compounds which contain at least two ortho-dichloromethyl groups and all of whose hydrogen atoms are substituted by other CHCl$_2$ groups and/or by chlorine atoms, are hydrolysed with at least 75% sulphuric acid or oleum at temperatures in the range of from about 80 to 200° C.

Most of the aromatic compounds suitable for reaction in the process according to the invention correspond to the general formula:

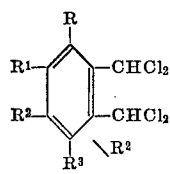

in which the radicals R, R$^1$, R$^2$ and R$^3$ represent chlorine atoms and/or CHCl$_2$ groups, or are (bridge)-members of another aromatic ring system (preferably of another benzene ring substituted as mentioned above).

The following examples from the benzene series are intended to illustrate the process according to the invention:

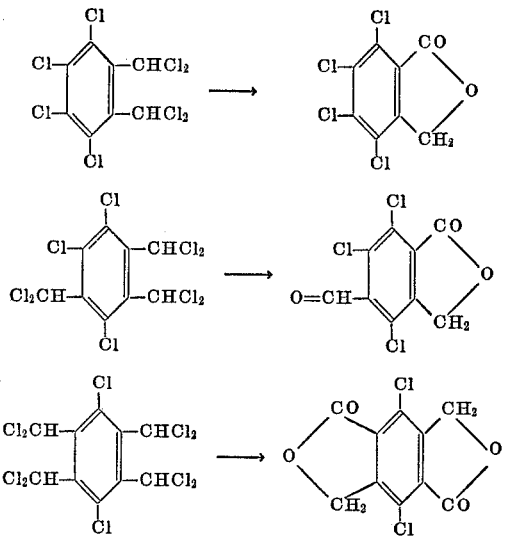

The ortho-bis(dichloromethyl)-compounds used as starting materials are known from the literature or can be obtained by known processes by the nuclear- and/or side-chain chlorination of aromatic compounds substituted by at least two adjacent methyl groups, for which purpose it has proved to be of particular advantage that the ortho-bis-(dichloromethyl)-compounds required for the process according to the invention represent stable terminal chlorination stages which can be obtained in high yields and in a highly pure form. The compounds listed below represent stable terminal chlorination stages such as these and are mentioned in examples of starting materials for the claimed process

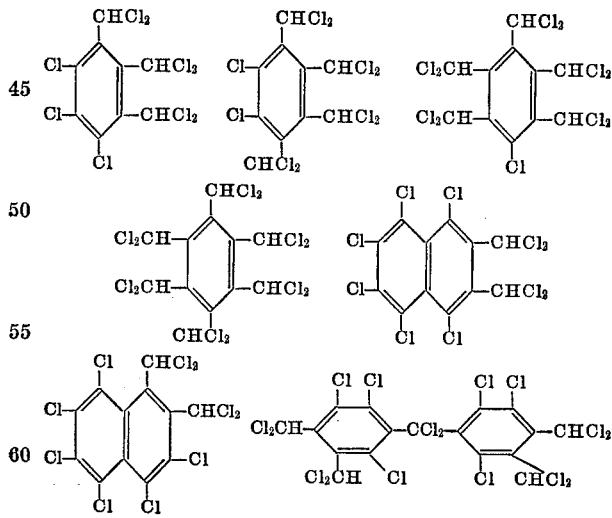

The ortho-bis-(dichloromethyl)-compounds are reacted to form the required aromatic lactones by introduction into concentrated sulphuric acid or into oleum, preferably with stirring, followed by heating to the required reaction temperature. This temperature varies from one halogen compound to another although it is easily recognised by the appearance of gaseous hydrogen chloride. It is generally between 80 and 200° C. and preferably between about 110° C. and about 180° C. The cessation in the evolution of HCl signifies the end of the hydrolysis reaction.

The sulphuric acid used to carry out the process according to the invention contains at least about 75% by weight of $H_2SO$, although it is of course possible to use 100% sulphuric acid. A commercial grade 96 to 98% sulphuric acid is preferably used. Instead of sulphuric acid, it is also possible to use oleum, a 100% sulphuric acid containing up to 65% and preferably up to 20% of $SO_3$. The quantity in which the sulphuric acid is used is generally such that the reaction mixture can still be effectively stirred. The reaction product is with advantage worked up by stirring the reaction mixture into ice water or crushed ice, the lactones being precipitated in the form of solid substances. They are isolated in the usual way by filtration under suction and washing with water.

The compounds obtainable by the process according to the invention are new, apart from 3,4,5,6-tetrachlorophthalide, and correspond to the general formula:

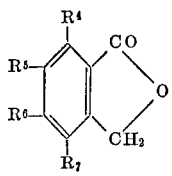

in which the radicals $R^4$, $R^5$, $R^6$ and $R^7$ represent chlorine atoms and/or CHO-groups or alternatively are (bridge)-members of another aromatic ring substituted as mentioned above, in which case two adjacent radicals form a lactone ring with the group $-CH_2-O-CO$.

The aromatic lactones produced by the process according to the invention represent valuable intermediate products. They may be reacted inter alia with primary or secondary amines with one or more chlorine atoms being exchanged, to form fluorescent dyes or optical brighteners. Some properties of compounds such as these are listed in the following table. The fluorescent dye indicated appears on exposure to ultra-violet light:

The process according to the invention is illustrated by the following examples:

EXAMPLE 1

381 g. (1 mol.) of tetrachloro-1,2-bis-(dichloromethyl)-benzene were introduced at room temperature into 1900 ml., of concentrated sulphuric acid. The reaction mixture was heated with vigorous stirring to 110–120° C. over a period of 10 hours, during which a stream of nitrogen was passed through it. After cooling, the clear, dark red reaction solution was poured onto ice and the tetrachlorophthalide precipitated was washed neutral with water. After drying, the 3,4,5,6-tetrachlorophthalide which corresponds to the formula:

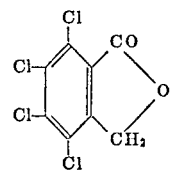

is recrystallised from benzene. Bright yellow needles melting at 207 to 208° C. Yield: 225 g. (82% of the theoretical).

The mixed melting point with an authentic preparation (see C. Graebe, A. 238, 330 (1887)), did not show any depression. The IR- and NMR-spectra of both samples are identical.

EXAMPLE 2

360 g. (0.75 mol.) of αH, α'-H, α''-H, α'''-H-decachlordurol were introduced into 1000 ml. of concentrated sulphuric acid. The mixture was heated to 170–190° C. until the evolution of HCl stopped (after about 10 hours). After cooling, the reaction mixture was stirred into 3 kg. of crushed ice, and the precipitate was suction filtered and washed thoroughly with water. 3,6-dichloropyromellitide was boiled thoroughly with 750 ml. of acetone, suction filtered and dried in vacuo at 100° C. An almost colourless powder corresponding to the formula:

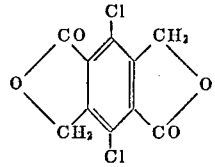

M.P. above 365° C. Yield: 168 g.=86.7% of the theoretical.

$C_{10}H_4Cl_2O_4$ (MG 259).— Calculated (percent): C, 46.33; H, 1.54; Cl, 27.41; O, 24.71. Found (percent): C, 46.31; H, 1.72; Cl, 27.15; O, 24.38.

The infra-red spectrum of this compound shows a carbonyl band at 1760 cm.$^{-1}$ which corresponds to the lactone structure.

EXAMPLE 3

215 g. (0.5 mol.) of trichloro-1,2,4-tris-(dichloromethyl)-benzene were introduced with vigorous stirring into 1000 ml. of concentrated sulphuric acid. The reaction mixture was heated to 120–130° C. over a period of 10 hours during which nitrogen was passed through it. After cooling, the reaction mixture was poured onto ice. The 3,5,6-

| Amine: CH$_3$-(CH$_2$)$_3$-CH-CH$_2$-NH- \| C$_2$H$_5$ | Amine: CH$_3$-N◯N- |
|---|---|
| Properties: Yellowish crystals, M.P. 105° C., blue fluorescence. | Properties: Yellow crystals, M.P. 330° C., yellowish/green fluorescence. |
| Amine: CH$_3$-◯H◯-NH- | Amine: O◯N- |
| Properties: Yellowish crystals, M.P. 219° C., blue fluorescence. | Properties: Yellow crystals, M.P. 348° C., yellowish/green fluorescence. |
| Amine: ◯-CH$_2$-NH- | Amine: ◯-N- |
| Properties: Yellowish crystals, M.P. 230° C. blue fluorescence. | Properties: Yellowish cyratsls, M.P. 331° C. yellowish/green fluorescence. | trichloro-4-formylphthalide which corresponds to the formula:

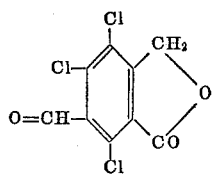

was washed neutral with water and dried at 100° C. in a vacuum drying cabinet. Ochre-coloured powder-melting at 140° C. Yield: 102 g. (77% of the theoretical).

The infra-red spectrum of this compound shows two carbonyl bands, one at 1770 cm.$^{-1}$ which corresponds to the lactone group, and the other at 1705 cm.$^{-1}$ which corresponds to the aldehyde group.

We claim:

1. Process for the production of aromatic lactones which comprises hydrolyzing an aromatic compound having the formula

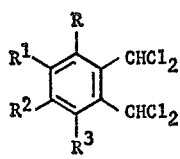

in which the radicals R, R$^1$, R$^2$ and R$^3$ each individually is selected from the group consisting of a chloro substituent, a —CHCl$_2$ substituent and a —CCl$_2$— bridge member connected to another corresponding aromatic moiety having said formula, at least one of said radicals R, R$^1$, R$^2$ and R$^3$ being chloro, with the proviso that two adjacent said radicals R, R$^1$, R$^2$ and R$^3$ when taken together with the aromatic nucleus form a naphthalene nucleus in which the remaining nuclear positions thereof have all of the corresponding hydrogen atoms thereat substituted by said substituents, with a hydrolyzing agent selected from the group consisting of sulfuric acid containing 75–100% by weight H$_2$SO$_4$ and sulfuric acid containing up to 65% SO$_3$ at a temperature between about 80–200° C., to form the corresponding aromatic lactone having the formula

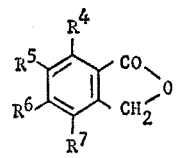

in which the radicals R$^4$, R$^5$, R$^6$ and R$^7$ each individually is correspondingly selected from the group consisting of a chloro substituent, a —CHO substituent and a —CCl$_2$— bridge member connected to another corresponding aromatic lactone moiety having said last-mentioned formula, at least one of said radicals R$^4$, R$^5$, R$^6$ and R$^7$ correspondingly being chloro, with the corresponding proviso that two adjacent said radicals R$^4$, R$^5$, R$^6$ and R$^7$ when taken together with the aromatic nucleus form a naphthalene nucleus in which the remaining nuclear positions thereof have all of the corresponding hydrogen atoms thereat substituted by said last-mentioned substituents, and with the additional proviso that two adjacent said radicals R$^4$, R$^5$, R$^6$ and R$^7$ form a corresponding lactone moiety when the corresponding two adjacent radicals R, R$^1$, R$^2$ and R$^3$ in the starting aromatic compound are —CHCl$_2$ groups.

2. Process according to claim 1 wherein the temperature is between about 110–180° C.

3. Process wherein said aromatic compound is selected from the group consisting of

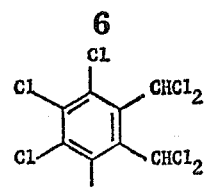

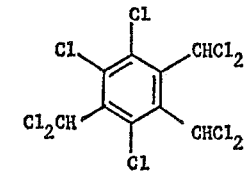

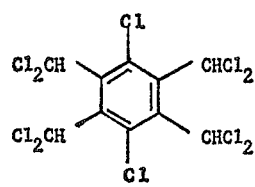

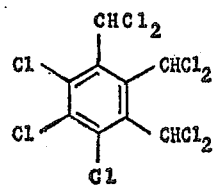

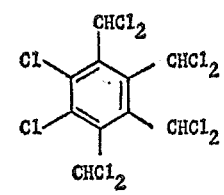

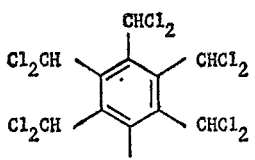

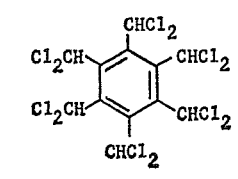

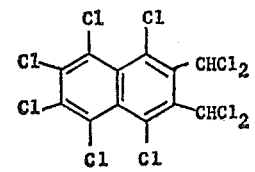

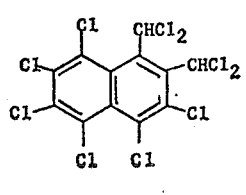

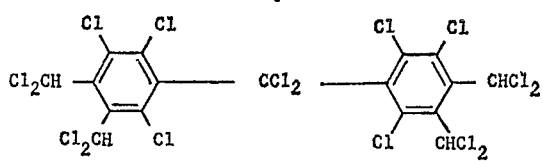
4. Process for preparing 3,4,5,6-tetrachlorophthalide which comprises hydrolyzing tetra-1,2-bis-(dichloromethyl)benzene with concentrated sulfuric acid at a temperature between about 110–120° C.
References Cited
UNITED STATES PATENTS
3,342,837  9/1967  Chang _____ 260—343.3
NICHOLAS RIZZO, Primary Examiner
A. M. T. TIGHE, Assistant Examiner
U.S. Cl. X.R.
252—301.3; 260—649 R, 651 R